Nov. 29, 1927.
W. P. JOHNSON
POULTRY CAR
Filed Dec. 6, 1926   2 Sheets-Sheet 1
1,651,129
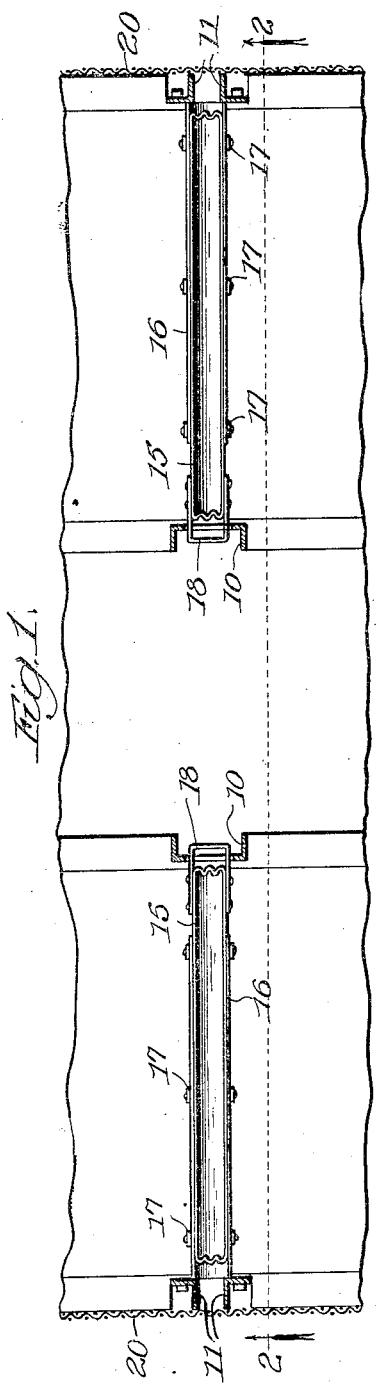
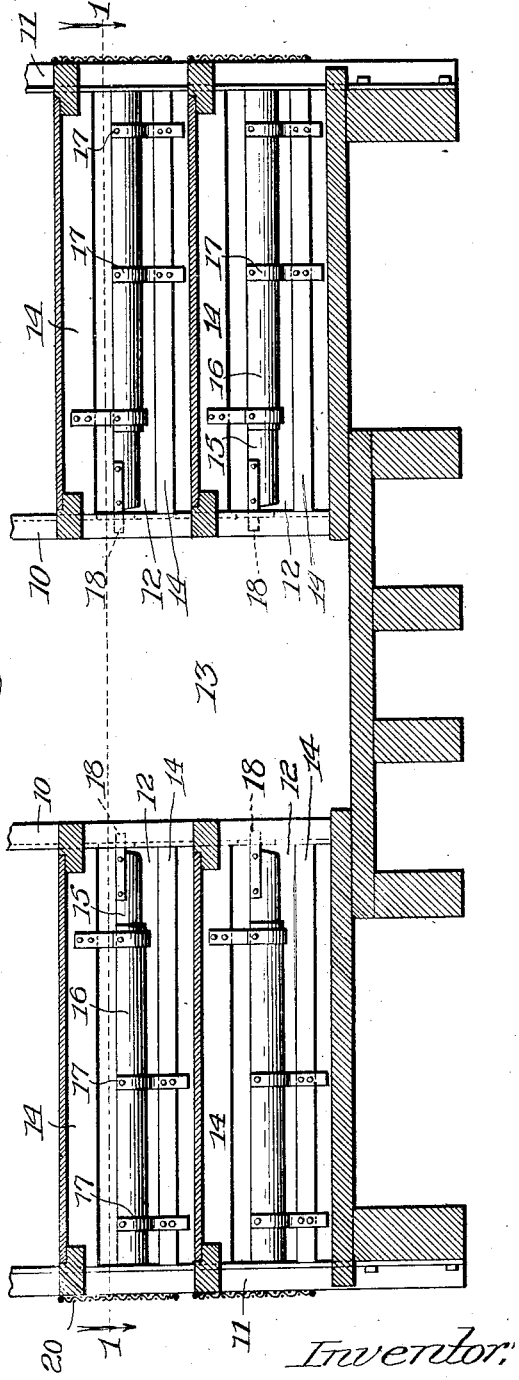
Inventor:
Waldo P. Johnson, Nov. 29, 1927.
W. P. JOHNSON
POULTRY CAR
Filed Dec. 6, 1926
1,651,129
2 Sheets-Sheet 2
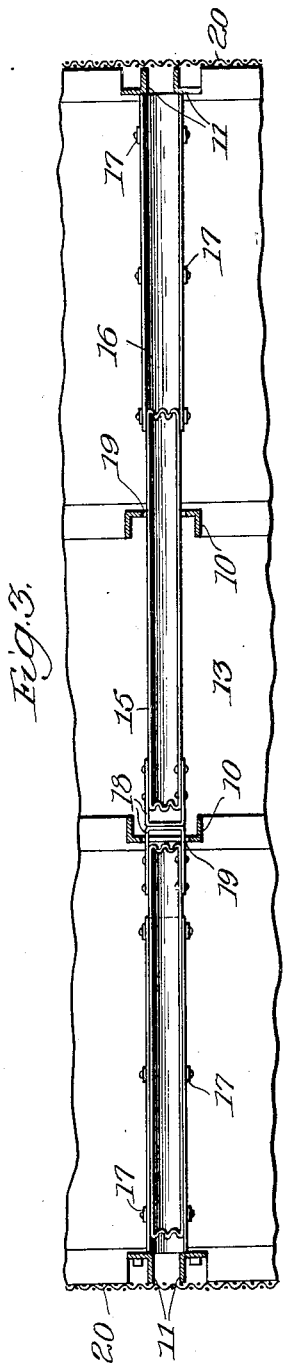
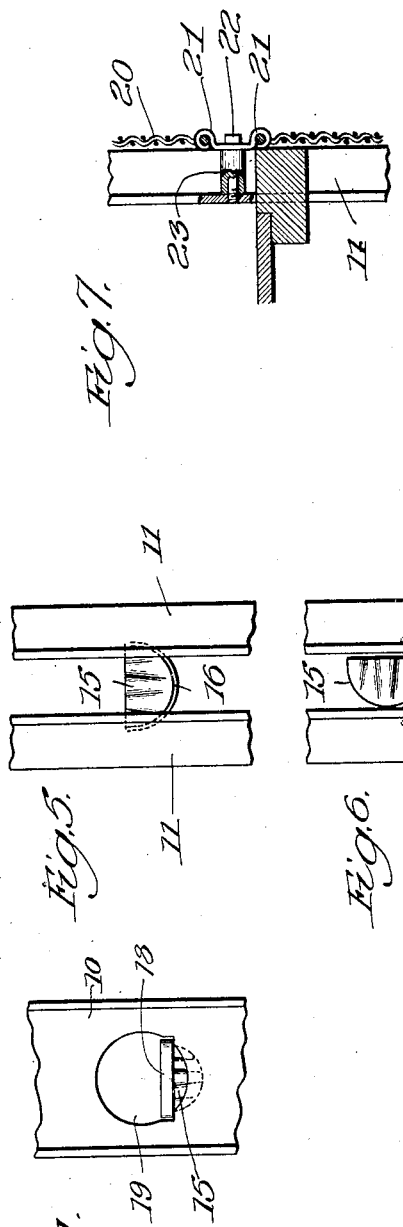
Inventor
Waldo P. Johnson,
By Dyrenforth, Lee, Chritton & Wiles
Attys Patented Nov. 29, 1927.

1,651,129

UNITED STATES PATENT OFFICE.

WALDO P. JOHNSON, OF CHICAGO, ILLINOIS.

POULTRY CAR.

Application filed December 6, 1926. Serial No. 152,875.

This invention relates to improvements in poultry cars and more especially to poultry cars of a form now in common use in which there is provided a series of coops on each side of the car, thus forming a central aisle. In cars of this kind, adjacent coops in the same tier are separated by partitions with troughs for water and feed forming a part of these partitions. Such troughs are ordinarily so mounted that they may be drawn endwise part way into the central aisle for the purpose of giving better access to the same for dumping, cleaning, filling and the like.
Hereafter, for brevity, I shall describe the construction and operation of a single trough and its slide or guide; and it is to be understood that the construction and operation of all the troughs is similar.
Throughout this specification and claims, in speaking of drawing the trough into the aisle, or withdrawing the trough, I refer only to the endwise sliding movement of the trough in the guide permitting it to be drawn into the aisle until its inner end strikes the opposite side of the aisle. When in such position, however, it is to be distinctly understood that the outer end of the trough is still in the guide and held thereby so that the trough cannot be completely removed or taken away. In speaking of removing the trough I refer to the complete extraction of the trough from the guide so that it can be entirely lifted out and carried away from the car.

One of the objects of my invention is to construct the trough and trough support or guide in a car of this kind, so that the trough may be drawn part way into the aisle as mentioned above, but so that it cannot be entirely removed from the guide into the aisle. This is an important feature, since it prevents the trough from being stolen or removed for other unauthorized purposes. In general this feature of the invention is accomplished by carrying the trough in a guide supported between an aligned aisle post and side post. The guide closely surrounds the trough and remains in contact with the outer end thereof even when the trough is drawn into the aisle, thus preventing its complete removal into the aisle. The trough is somewhat longer than the width of the aisle so that its inner end strikes the opposite side of the aisle before its outer end is free from the guide. Thus, it is impossible to completely remove the trough into the aisle.

Another object of the invention is to provide some means to permit the occasional authorized complete removal of a trough, as this is some times necessary for repairing, and replacement purposes and the like. I have provided such means, as will be explained more in detail hereafter, but although such means permits the complete removal of the trough, this can be accomplished only from the outside of the car and then only after the release or removal of one or more holding means or locking devices. The complete removal of a trough being permitted only in this manner and by one outside of the car exposed to view, eliminates or lessens the danger of unauthorized removal of a trough.

Another object is the provision of means for getting some light and air into the trough so as to make it more sanitary.

These and other objects as will hereinafter appear are accomplished by this invention which is fully described in the following specification and shown in the accompanying drawings, in which Figure 1 is a partial horizontal section on line 1—1 of Fig. 2; Fig. 2 is a partial transverse vertical section on the line 2—2 of Fig. 1; Fig. 3 is a view similar to Fig. 1 showing the trough drawn into the aisle; Fig. 4 is a partial front elevation of an aisle post showing the trough inserted as in Fig. 1; Fig. 5 is an outside elevation of a side post with the screen removed and showing the trough in normal operative position; Fig. 6 is a view similar to Fig. 5 but showing the trough turned at an angle of 90° preparatory to removing it from the guide; and Fig. 7 is a detail showing the method of fastening the screens in place.

The embodiment illustrated comprises a poultry car having aisle posts 10 and side posts 11 which carry tiers of coops 12 arranged at the side of the car and forming a central aisle 13.

Partitions 14 are arranged between adjacent coops in the same tier and these are carried by the aisle posts 10 and side posts 11. Troughs 15 of sheet metal are carried in guides 16 also preferably of sheet metal which mostly surround the lower portions of the troughs and are connected to the partition by a series of braces 17 or the like.

These troughs have outwardly extending handles 18 by which they may be withdrawn through openings 19 in the aisle posts until they extend across the aisle as shown in Fig. 3, where it will be seen that the trough 15 is somewhat longer than the width of the aisle 13 so that when the trough is drawn into the aisle as far as it will go until its inner end strikes the opposite side of the aisle, its outer end is still held and supported in the guide 16 so that it cannot be completely removed into the aisle.

Each of the guides 16 is preferably supported by two upwardly extending braces or stirrups 17 having their upper ends attached to the guide and their lower ends attached to the lower partition member 14, and another similar downwardly projecting brace or stirrup fastened to the upper partition member 14.

I preferably have constructed each side post 11 of two angle irons set back to back as shown in Figs. 1, 5, and 6 and at such a distance apart that when the trough 15 is in the normal horizontal position shown in Fig. 5, the trough will strike against these angle irons which will prevent its removal. By turning it on its side, however, as shown in Fig. 6, the trough may be removed through the space between the angle irons and thus completely removed from the car for cleaning, repair, and replacement. This removal may be accomplished without any straining, bending, or distorting of the trough.

To prevent, however, the too easy removing of the trough in this manner, I have closed the space at the side of the car with a series of wire screens 20. These are preferably held in place by means of cleats 21 as shown in Fig. 7 which are secured to the side posts by means of bolts 22 and spacers 23. Each screen preferably extends one half the length of the car so that in order to remove even a single trough, it is necessary to take out a number of bolts and substantially remove one of these screens. Any suitable locking means may be added to these if it is desired to make it still more difficult for any unauthorized person to remove the trough.

It will be understood also that this arrangement permits a great deal of sunlight and air to reach the trough, particularly that end of the trough lying nearest the side posts.

While I have shown and described but a single embodiment of the invention, it is to be understood that it is capable of many modifications. Changes, therefore, may be made which do not depart from the spirit and scope of the invention as disclosed in the appended claims.

It is to be particularly noted that the guiding means for the troughs must fit snugly enough and the troughs must be long enough so that they can not be moved into the aisle. In the use of the word "snugly fitting" in the claims I mean that the guiding means must fit snugly enough considering the length of the trough and the width of the aisle, so that the trough is not completely removable into the aisle, at least, not removable without distorting, bending, or breaking the same. When I say it is not removable, I mean that in the ordinary manipulation of the same, it can not be removed into the aisle.

What I claim as new, and desire to secure by Letters Patent, is:

1. In a poultry car, tiers of coops on each side forming a central aisle, troughs of greater width than depth between adjacent coops in the same tire, means for guiding said troughs so as to permit them to be drawn into the central aisle, said troughs being longer than the width of said aisle so that they cannot be removed into the aisle, spaced members forming side posts at the outside of the car, the space between said members permitting the trough to be removed therethrough when turned edgewise but preventing its removal therethrough when in the normal operative position, and means for closing the space between said members.

2. In a poultry car, tiers of coops on each side forming a central aisle, troughs of greater width than depth between adjacent coops in the same tier, means for guiding said troughs so as to permit them to be drawn into the central aisle, said troughs being longer than the width of said aisle so that they cannot be removed into the aisle, side posts at the outside of the car having an opening through which the trough can be removed when turned edgewise but preventing its being removed when lying in normal operative position, and means for closing said opening.

3. In a poultry car, tiers of coops on each side forming a central aisle, troughs of greater width than depth between adjacent coops in the same tier, means for guiding said troughs so as to permit them to be drawn into the central aisle, said troughs being longer than the width of said aisle so that they cannot be removed into the aisle, side posts at the outside of the car having an opening through which the trough can be removed when turned edgewise but preventing its being removed when lying in normal operative position, and a screen extending across a plurality of posts for closing said openings.

4. In a poultry car, tiers of coops on each side forming a central aisle, troughs between adjacent coops in the same tier, snugly fitting guiding means permitting the troughs to be drawn into the aisle, the troughs being longer than the width of the aisle so that they are not removable thereinto, and said troughs being removable outwardly from the sides of the car.

5. In a poultry car, tiers of coops on each side forming a central aisle, troughs between adjacent coops in the same tier, snugly fitting guiding means permitting the troughs to be drawn into the aisle, the troughs being longer than the width of the aisle so that they are not removable thereinto, said troughs being removable outwardly from the sides of the car, and removable means to prevent such removal.

6. In a poultry car, tiers of coops on each side forming a central aisle, troughs between adjacent coops in the same tier, snugly fitting means for guiding said troughs so as to permit them to be drawn into the central aisle, said troughs being longer than the width of said aisle so that they cannot be removed into the aisle, spaced members forming side posts at the outside of the car, the space between said members permitting the trough to be removed therethrough, and means for preventing such removal.

7. In a poultry car, tiers of coops on each side forming a central aisle, troughs between adjacent coops in the same tier, sungly fitting means for guiding said troughs so as to permit them to be drawn into the central aisle, said troughs being longer than the width of said aisle so that they cannot be removed into the aisle, spaced members forming side posts at the outside of the car, the space between said members permitting the trough to be removed therethrough, and removable means for preventing such removal.

8. In a poultry car, tiers of coops on each side forming a central aisle, troughs between adjacent coops in the same tier, and guiding means permitting the troughs to be drawn into the aisle, said guiding means snugly fitting the troughs and the troughs being longer than the width of the aisle so that they are not removable thereinto.

9. In a poultry car, tiers of coops on each side forming a central aisle, troughs between adjacent coops in the same tier, guiding means permitting the troughs to be drawn into the aisle, said guiding means snugly fitting the troughs and the troughs being longer than the width of the aisle so that they are not removable thereinto, said troughs being removable outwardly from the sides of the car.

10. In a poultry car, tiers of coops on each side forming a central aisle, troughs between adjacent coops in the same tier, guiding means permitting the troughs to be drawn into the aisle, said guiding means snugly fitting the troughs and the troughs being longer than the width of the aisle so that they are not removable thereinto, said troughs being removable outwardly from the sides of the car, and removable means for preventing said last mentioned removal.

In testimony whereof I have hereunto set my hand this 30th day of November, A. D., 1926.

WALDO P. JOHNSON.